June 15, 1926.  
F. PAVELIK  
RETORT  
Filed Dec. 22, 1922  
1,589,217  
2 Sheets-Sheet 2

Frank Pavelik  
INVENTOR  
BY Victor J. Evans  
ATTORNEY

WITNESS: R. E. Wise

Patented June 15, 1926.

1,589,217

UNITED STATES PATENT OFFICE.

FRANK PAVELIK, OF PUYALLUP, WASHINGTON, ASSIGNOR OF ONE-HALF TO ELMER E. HEALEY, OF PUYALLUP, WASHINGTON.

RETORT.

Application filed December 22, 1922. Serial No. 608,520.

The object of my invention is the provision of a retort that is simple and inexpensive in construction and is highly efficient in operation; the substance to be acted on in the retort being carried into and out of proximity to heat chambers by travelling conveyors and the substance being turned over completely in an automatic manner as it passes from one conveyor to the next lower conveyor.

The retort is designed more particularly for extracting oil from shale, though it is also adapted to be used to advantage for extracting moisture from lignite coal. The retort includes a plurality of outlets variously located, and the said outlets are utilized when the retort is employed for the extraction of oil from shale to carry off the different vapors as soon as the vapors are generated, with a view to keeping the vapors from going into the higher heats inasmuch as the heat cracks the light vapors and when they crack they carbonize. The light vapor or gasolene is given off at a temperature of about 350 degrees F. The next vapor given off is kerosene which requires a higher heat, after which with higher heats various grades of oil are given off. For these reasons the plurality of outlets, preferably arranged as illustrated, are employed.

To the attainment of the foregoing, the invention consists in the improvement as hereinafter described and definitely claimed.

In the accompanying drawings, forming part of this specification:—

Similar numerals of reference designate corresponding parts in both views of the drawings.

Figure 1:
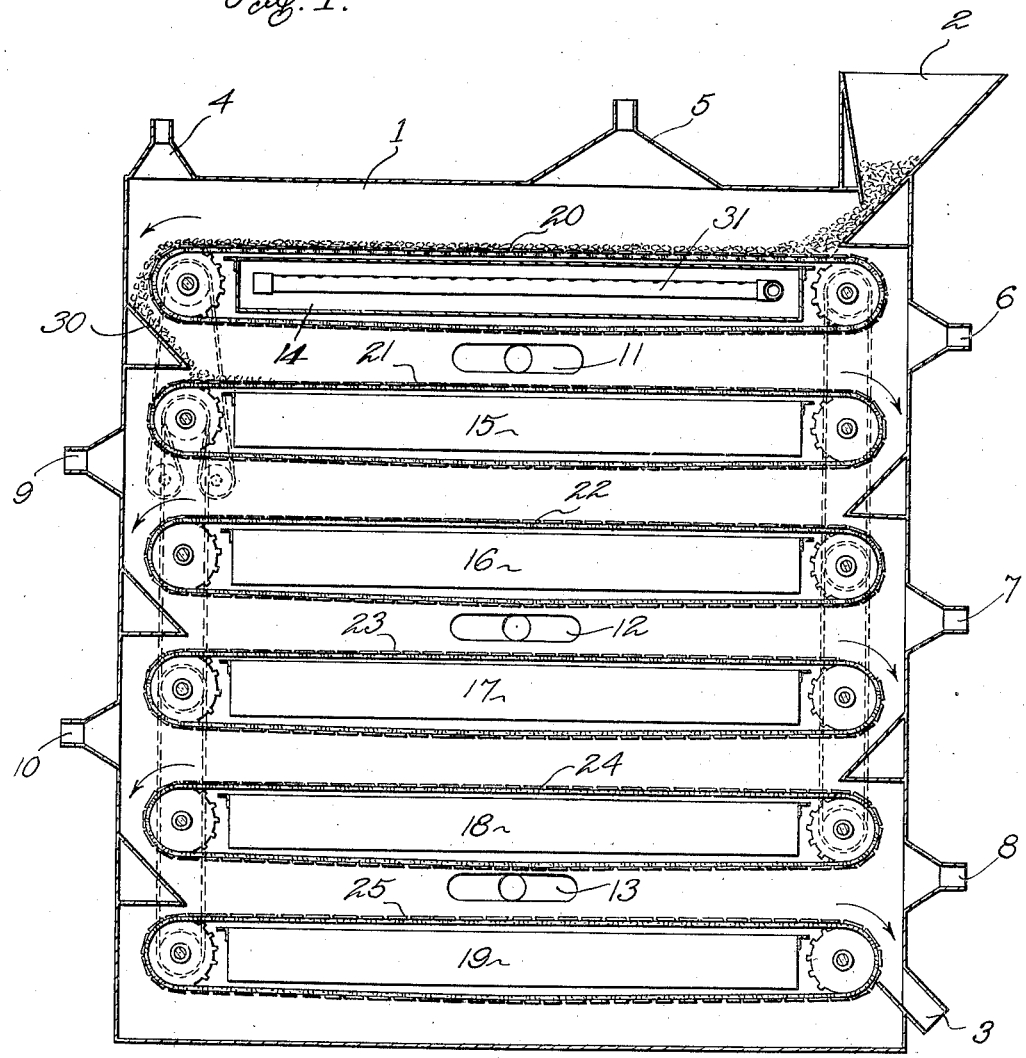
Figure 1 is a vertical longitudinal section of a retort constructed in accordance with my invention, the driving connections being illustrated by dotted lines with all of the ovens save the top oven in elevation.
Figure 2:
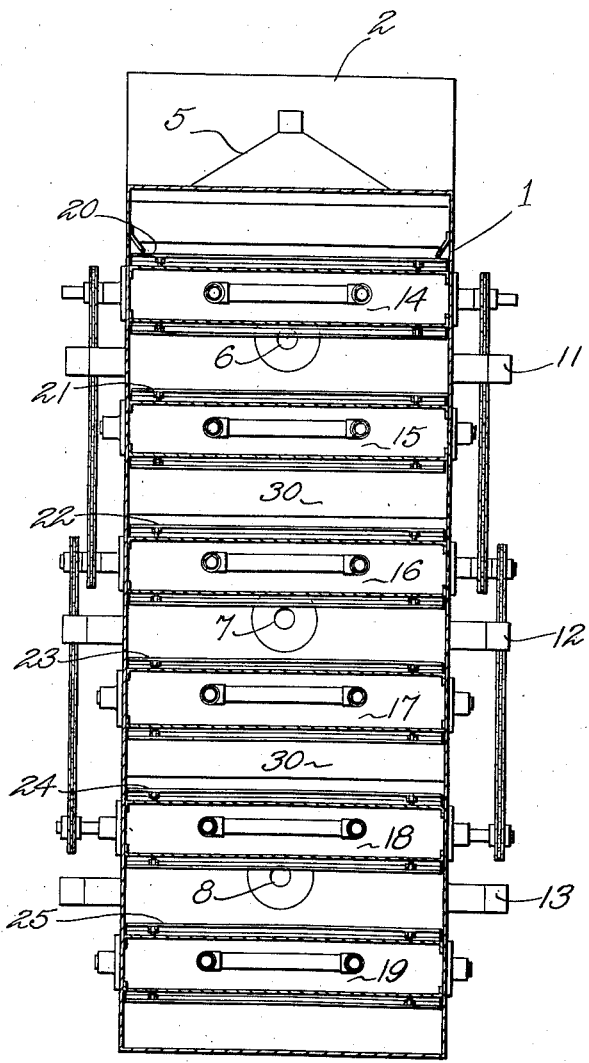
Figure 2 is a vertical transverse section of the retort.

Among other elements my novel retort comprises an appropriate casing 1. The said casing 1 is equipped at its upper end with a feed hopper 2 and at its lower end with a discharge spout 3. At its top the casing is provided with outlets 4 and 5, and at one end the casing is provided with outlets 6, 7 and 8 while at its opposite end the casing is provided with outlets 9 and 10. It will also be noted that in its sides at the points 11, 12 and 13 the casing is provided with other outlets.

Arranged one above the other and spaced apart in the casing 1 are ovens 14, 15, 16, 17, 18 and 19, each pair of the said ovens being preferably arranged with the side outlets between them as illustrated. The said ovens are designed to be heated by the consumption of gas, and as will be readily understood the supply of gas may be and preferably is so regulated that the oven 15 may be heated to a higher degree than the oven 14, the oven 16 may be heated to a higher degrees than the oven 15, the oven 17 may be heated to a higher degree than the oven 16, the oven 18 may be heated to a higher degree than the oven 17 and the oven 19 may be heated to a higher degree than the oven 18. I would also have it understood that it is within the purview of my invention to employ any appropriate number of the ovens arranged one above the other and spaced apart. Each oven is arranged between the upper and lower stretches of an endless conveyor, and each conveyor is preferably made up of transverse iron slats flexibly connected together in appropriate manner, the uppermost endless conveyor being relatively arranged as shown to receive material from the hopper 2 and the lowermost endless conveyor being relatively arranged to discharge spent material from its upper stretch to the discharge spout 3. The said endless conveyors are appropriately mounted in the casing 1 and are numbered from 20 to 25 downwardly as illustrated. In the preferred embodiment of my invention the uppermost conveyor 20 is driven by any appropriate motor, and through the medium of the driving connection illustrated in dotted lines, Figure 1, or any other appropriate driving connection, the conveyor 21 is driven from the conveyor 20 but in a reverse direction thereto. In other words the upper stretch of the conveyor 20 is driven toward the left in Figure 1, the upper stretch of the conveyor 21 is driven toward the right in Figure 1, and so on downwardly, the upper stretch of the conveyor 22 being driven from the conveyor 20 through the connection illustrated toward the left in Figure 1, the upper stretch of the conveyor 23 being driven toward the right in Figure 1, the upper stretch of the conveyor 24 being driven toward the left in Figure 1, and the upper stretch of the conveyor 25 being driven toward the right in Figure 1. While I prefer the connections illustrated for the movement of the conveyors as stated I do not, of course, desire to be understood as confining myself to the said connections inasmuch as any other appropriate connection may be employed or the conveyors may be driven in any other appropriate manner without involving departure from the scope of my invention as defined in my appended claims. Manifestly in passing from each conveyor to the next lower conveyor the material, shale rock or lignite coal as the case may be passes over a chute 30 in the casing 1 and is turned over completely with the result that the giving off of vapor from the material is facilitated. This is also advantageous because in traversing the casing in one direction the material is heated by an oven below the upper stretch of one conveyor, and in traversing the casing in the opposite direction the material is heated by the oven below the upper stretch of the next lower conveyor. From this it follows that the turning over of the material in the manner indicated assures adequate heating of all of the material.

When the material treated is lignite coal the moisture given off by the coal can be conducted out of the casing through some or all of the outlets illustrated and described, though I would have it understood that the said outlets are designed more particularly for use when the apparatus or retort is used for the extraction of vapors from shale rock. Incident to the latter use of the apparatus the more volatile vapors are taken care of by the upper outlets, and the heavier vapors are taken care of by the lower outlets progressively.

Notwithstanding the practical advantages ascribed to my novel retort it will be apparent that the retort is simple and inexpensive in construction, is well adapted to withstand the purpose to which it is put, and is also adapted to be operated at low cost in proportion to the end attained.

In Figure 1 I show a gas burner 31 in the top oven 14, and it will be understood that each oven contains a similar or any other appropriate gas burner.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:

A retort of the character described comprising a casing having a plurality of vertical walls, a feed hopper rising from one side of the upper surface of said casing, superimposed endless conveyors traversing the casing and arranged in horizontal parallelism, means extending from the side walls of the casing for deflecting material from one conveyor to the other, a discharge chute extending from adjacent the bottom of the casing to receive the material from the lowermost conveyor, an oven for each conveyor and being disposed between the runs thereof, each oven being capable of independent operation, whereby the material carried by the conveyors may be subjected to different temperatures and said casing being formed with outlets in each of the vertical walls thereof, and said outlets being disposed between the respective conveyors.

In testimony whereof I affix my signature.

FRANK PAVELIK.